Oct. 5, 1943.  H. H. SMITH  2,331,082
AIRCRAFT ALIGHTING GEAR
Filed June 30, 1941  2 Sheets-Sheet 2
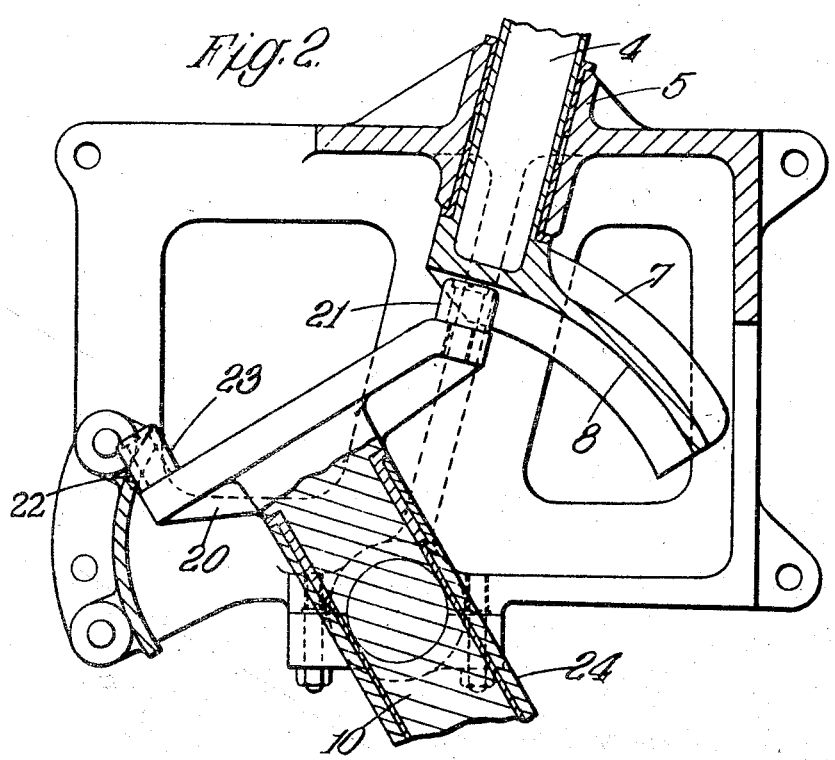
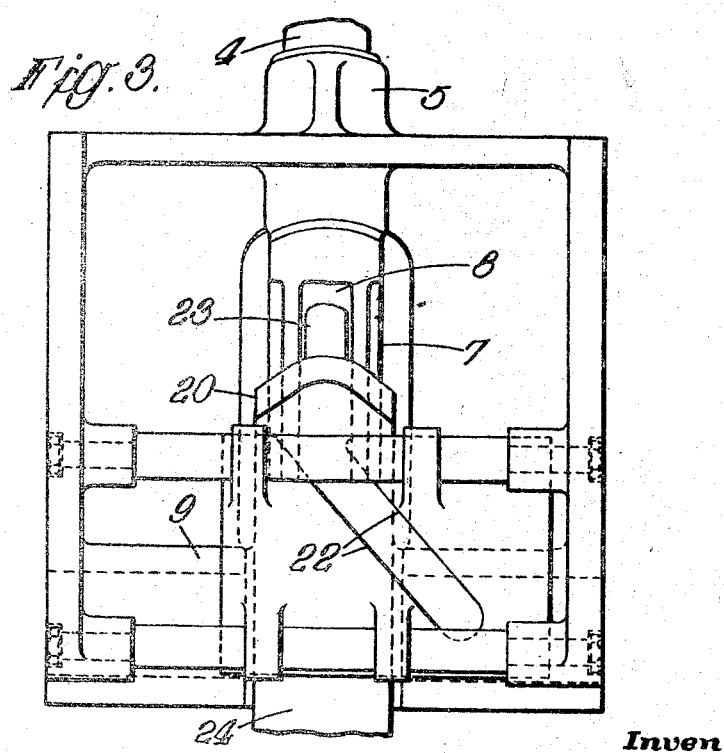
Inventor
Horace Henry Smith
by Reynolds & Beach
Attorneys Patented Oct. 5, 1943

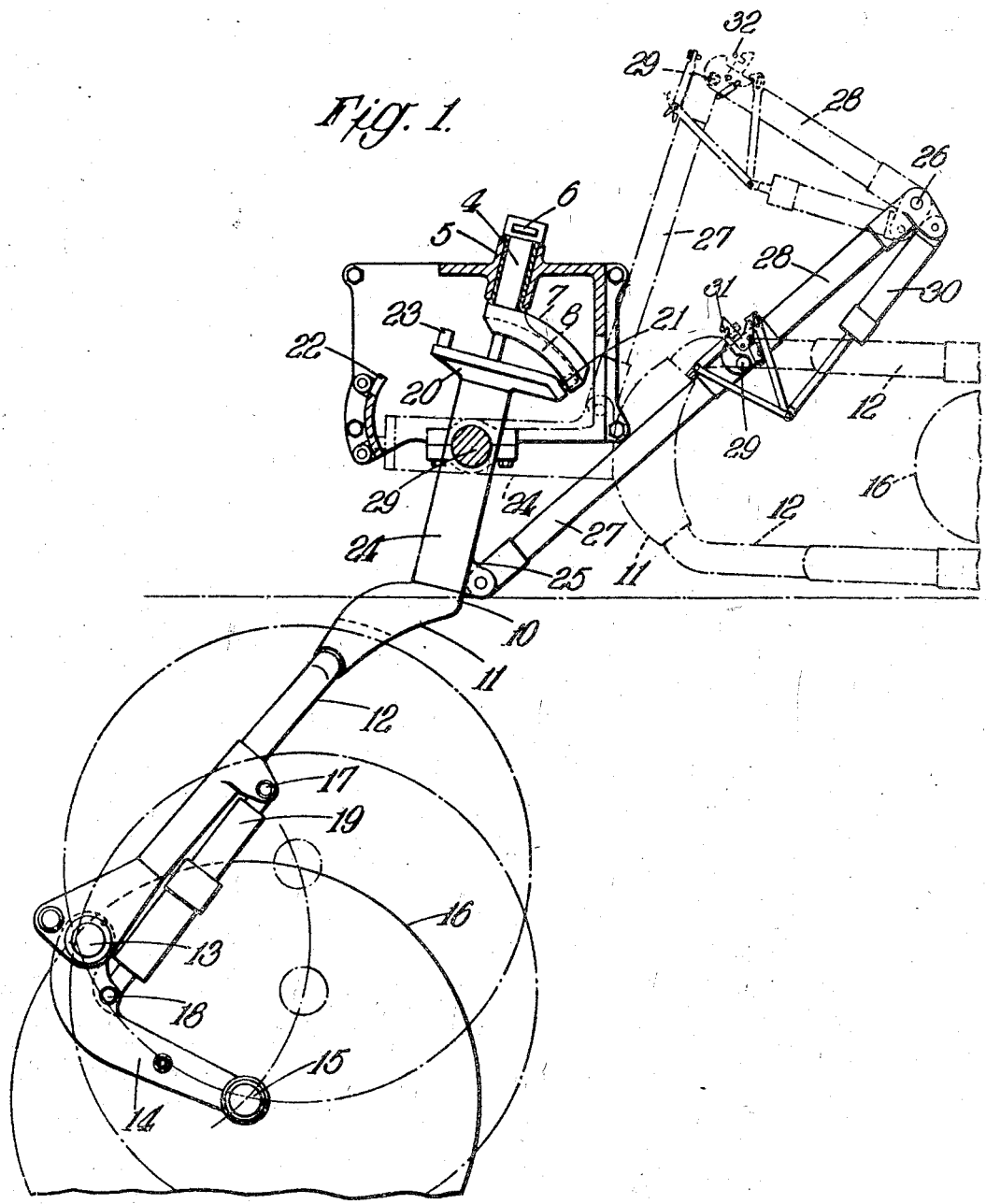

2,331,082

UNITED STATES PATENT OFFICE 2,331,082

AIRCRAFT ALIGHTING GEAR

Horace Henry Smith, Cheltenham, England, assignor to Dowty Equipment Limited, Cheltenham, England Application June 30, 1941, Serial No. 400,461
In Great Britain December 23, 1940

10 Claims. (Cl. 244—50)

This invention relates to aircraft alighting gear in which at least one component is both steerable and retractable.

The invention consists in a component of aircraft alighting gear including a steering part and a retractable landing element mounting steerably interconnected in the extended condition of the latter and disconnected in the retracted condition, and means to control the attitude of the retractable mounting about its steering axis in the retracted condition. Operative engagement between the steering part and the retractable mounting and between the attitude-controlling means is preferably achieved by pin-and-slot connections, the nature and disposition of which is to ensure correct entry of the connection on re-extension throughout the intended range of operation whatever may be the relative disposition of the steering member and retractable mounting. The attitude-controlling means may be such as to ensure turning of the retractable mounting about its steering axis as it swings in retraction and extension, whereby a landing element disposed in a fore-and-aft plane in the extended condition can be disposed substantially horizontally when retracted.

It is to be understood that where in the ensuing description and claims there is specified a component of aircraft alighting gear, it is to be understood that such a component is constituted by a structure which connects a landing element to the aircraft, the structure in the present case affording the necessary resilience to resist landing and taxiing loads, and at the same time to provide for steering and retraction of the component.

In order that it may be clearly understood and readily carried into effect, the invention is hereinafter described with reference to the accompanying diagrammatic drawings, of which:

Figure 1 is a side elevation, partly in section, showing in full lines a component according to the present invention in the extended condition—the broken line representations indicating the position of the component when retracted;

Figure 2 is an enlarged detail elevation partly in section illustrating the separable steering connections and showing the retractable mounting in a partly-retracted position; while Figure 3 is a front end elevation corresponding to Figure 2.

As shown, the component is applied to a steerable nose wheel mounting retractable in a fore and aft sense.

A steering column 4 is rotatable in the fixed housing 5 and has the laterally-extending horns 6 for connection to the rudder-bar of the aircraft. At its lower end the steering column 4 has a steering bracket 7, within which there is provided an open-ended slot 8—see particularly Figures 2 and 3. Swinging about a retraction pivot 9 fixed on the aircraft structure is a retractable mounting constituted by an upper leg part 10, having at its lower end a forked bracket 11 from which the laterally spaced fork arms 12 extend. At the lower end of each fork arm 12 is a pivot 13, and in trail of each pivot 13 there extends a lever 14, the trailing ends of the levers 14 being interconnected by the spindle 15 which mounts a landing element such as the wheel 16. Each arm 12 has a pin-joint 17, and each lever has a similar pin-joint 18. A telescopic shock-absorber 19 extends between each pair of pin-joints 17 and 18 and operates to resist swinging of the lever under landing and taxiing loads transmitted through the landing element 16. While the described wheel mounting and shock absorbing arrangement is preferred, any other suitable arrangement may be employed, so far as concerns the steerable and retracting features.

At its end remote from the landing element the upper leg part 10 carries a steering yoke 20 by means of which the retractable mounting can be turned about the lengthwise axis of the upper leg part 10 for steering. The steering yoke 20 extends fore and aft when the wheel 16 is centralised in an extended condition of the component, and at its rear end the yoke has a projection 21 which engages the slot 8 of the bracket 7. Forwardly of the retractable mounting is a fixed guide slot 22 into which the projection 23 at the forward end of the steering yoke engages, before the projection 21 leaves the slot 8, as the upper end of the retractable mounting swings forwardly and downwardly in retraction. The guide slot 22 is inclined, and by its co-operation with the projection 23 constitutes means for controlling the attitude of the retractable mounting in retraction and when retracted. Thus, it follows that in swinging about the axis 9 during retraction the guide slot 22 swings the projection 23 over, simultaneously turning the yoke 20, and therefore the upper leg part 10, about the longitudinal axis of the leg part 10. In the arrangement shown, the slot 22 has been designed to turn the retractable mounting through an angle of 90° so that the landing wheel 16 lies horizontal in the retracted condition, but it will be obvious that the slot can be devised to turn the wheel through any desired angle, or alternatively, if the slot 22 is vertical the control influence will be such as to keep the landing element in its fore and aft position. In order to avoid any possibility of uncontrolled rotation of the retractable mounting about its steering axis, it is important that, as shown in the partially retracted position of Figure 2, the forward projection 23 shall engage the receiving end of the fixed guide slot 22 before the rear projection 21 passes out of the slot 8 in the steering bracket 7. Likewise, in order to ensure reengagement of the projection 21 with the slot 8, the forward end of the slot must be disposed in line with the axis of steering column 4. Such an arrangement ensures complete independence between the rear projection 21 of the steering yoke and the slot 8 in their disengaged relationship, and it follows that whatever may be the angular disposition of the slot 8 about the steering column 4 within the operative range, the forward end of it is always disposed on the axis of the steering column to receive the projection 21 before the forward projection 23 leaves the fixed guide slot 22.

So that retraction means can be arranged in a simple manner, the upper leg part 10 rotates within an outer sleeve 24, which sleeve swings about the transverse axis 9 for retraction. The sleeve 24 has a bracket 25 between which and a fixed anchorage 26 on the aircraft structure any convenient retraction means operate. As shown in the drawings, retraction is effected by breaking the interconnected strut parts 27 and 28 of a radius rod about the interconnecting pivot 29 by means of the retraction jack 30. When the strut parts 27 and 28 are aligned, the retractable mounting is fully extended and is locked by any convenient means such as commonly employed for locking breakable radius rods. The latch also preferably includes a recess 31 to engage a fixed pin 32 in a fully-retracted condition of the retractable mounting. The latches are operated appropriately by lost-motion at each end of the jack stroke.

It will be realised that in the arrangement above described a single jack or other retraction device can be used for the dual purpose of swinging the retracting mounting in retraction and extension and turning it during retraction and extension appropriately about its steering axis. Steering movement, of course, is accomplished by other means, connected to the horns 6.

What I claim is:

1. In aircraft alighting gear, in combination a steerable ground-engaging element supported from and movable for retraction relative to the aircraft structure, a cooperating element non-retractably supported upon the aircraft structure and movable to effect steering of the retractably mounted element, means positioned for interengagement between said two elements when the one is in projected position, for transmission of steering movement to the ground-engaging member, and arranged to be disconnectable by the latter's movement into retracted position, and means positioned for engagement with the retractable member, by its movement into retracted position to change the attitude of said member relatively to the aircraft structure in a sense other than retraction.

2. An aircraft alighting gear as in claim 1, wherein the attitude-controlling means and the retractable steerable element are cooperatively organized and arranged to effect rotation of the steerable element, during retraction, from a normal fore-and-aft setting to a setting angularly rotated therefrom about its steering axis.

3. An aircraft alighting gear as in claim 1, characterized in that the retractable and steerable element is mounted for swinging in retraction in a fore-and-aft plane about a substantially transverse axis, and further characterized in that the attitude-controlling means and the retractable and steerable element are cooperatively organized and arranged to effect rotation of the steerable element, during retraction, from its normal fore-and-aft setting through substantially nintey degrees to a substantially horizontal retracted position.

4. An aircraft alighting gear as in claim 1, characterized in that the attitude-controlling means is positioned for engagement by the retractable steerable element before the latter disengages its steering element, in retraction, and vice versa, whereby the attitude of the steerable element is at all times under control of one or the other.

5. An aircraft alighting gear comprising, in combination, a post generally upright when extended, a ground-engaging member carried upon the lower end of said post, and extending in a fore-and-aft direction when in ground-engaging position, means supporting said post from the aircraft for rotation about its longitudinal axis, to dispose the ground-engaging member in a rotated position, and for swinging, in retraction, about a transverse axis, a steering column supported upon the aircraft structure in axial alignment with said post when the latter is in extended position, means interengageable between the steering column and post, in extended position, for transmission of steering movement to the post, said means being organized and arranged for disengagement by swinging of the post to retracted position, and means positioned for engagement by the post during retraction, to rotate the latter about its longitudinal axis, and to retain it during retraction in such rotated position.

6. An aircraft alighting gear as in claim 5, characterized in that the means interengageable between the steering column and post includes a radially extending arm carried by each, and a radial key and slot connection therebetween, and further characterized in that the post-rotating means is engageable by the post, to control the attitude of the latter, before disengagement of said key and slot connection.

7. An aircraft alighting gear as in claim 5, characterized in that the means interengageable between the steering column and the post comprises a pin carried by and supported outwardly of the longitudinal axis of the post, a radially slotted arm carried by the steering column and curved about the transverse axis of retraction for engagement by the pin while extended, and during the initial part of retraction, said slot terminating to disengage the pin when the latter is axially aligned with the steering column, and further characterized in that the post-rotating means comprises a second pin carried by the post, and offset from its axis, and a fixedly positioned slotted member, likewise curved about the transverse axis of retraction, and positioned to engage the second pin before the first pin disengages its radial slot, the slot in the fixedly positioned member being shaped to rotate the post about its longitudinal axis while it is swinging about its transverse axis.

8. An aircraft alighting gear comprising a steerable yoke mounted for rotation about a generally upright axis, a landing leg mounted for swinging in retraction and extension about an axis transverse to said upright axis, to and from an extended position wherein it is aligned with such upright axis, and for steering rotation about such upright axis when thus aligned, means interengageable between said yoke and said landing leg to transmit steering torque to the latter, but separable by swinging of the leg about said transverse axis, and means engageable with said landing leg, prior to its separation from said yoke, and disengageable therefrom following reengagement of the leg and yoke, to restrain and control rotation of the leg about its steering axis during its swinging about the retracting axis.

9. An aircraft alighting gear comprising a steerable yoke mounted for rotation about a generally upright axis, a landing leg mounted for swinging in retraction and extension about an axis transverse to said upright axis, to and from an extended position wherein it is aligned with such upright axis, and for steering rotation about such upright axis when thus aligned, means interengageable between said yoke and said landing leg to transmit steering torque to the latter, but separable by swinging of the leg about said transverse axis, and means engageable with said landing leg, prior to its separation from said yoke, and disengageable therefrom following reengagement of the leg and yoke, to restrain and control rotation of the leg about its steering axis during its swinging about the retracting axis, the yoke, interconnecting means, and restraining means being disposed and arranged for transfer of the control function substantially simultaneously from one such means to the other, both in retraction and in extension, and regardless of the rotated position of said yoke.

10. An aircraft alighting gear comprising a steerable yoke mounted for rotation about a steering axis, a landing leg mounted for steering rotation about a steering axis which is generally upright when the landing leg is extended, and mounted also for movement in extension and retraction in a direction transverse to its steering axis, two cooperating means operatively connected one with the yoke and the other with the landing leg, for rotation about their respective steering axes through a common arcuate path, for transmission of steering torque to the leg, the leg-connected one of such means being movable, relative to the complemental yoke-connected means, and by movement of the leg in retraction, from such torque-transmitting position to an inoperative position, and means to guide said leg-connected torque-transmitting means, during extension of the leg, into operative engagement with the complemental yoke-connected means, regardless of the rotated position of the latter about its steering axis.

HORACE HENRY SMITH.